2,903,472

METHOD FOR PREPARING A COMPLEX OF AN ALUMINUM ALCOHOLATE WITH ALUMINUM AND BORON HYDRIDES

Janos Kollonitsch, Westfield, N.J., assignor to Metal Hydrides Incorporated, Beverly, Mass., a corporation of Massachusetts No Drawing. Application January 13, 1958
Serial No. 708,404

5 Claims. (Cl. 260—448)

This invention relates to the preparation of complexes of an aluminum alcoholate with aluminum and boron hydrides having the formula $$AlH_3(BH_3)_3\left[Al\begin{matrix}OR\\-OR_1\\OR_2\end{matrix}\right]_3$$

in which R, $R_1$ and $R_2$ are monovalent radicals selected from the group consisting of alkyl, cycloalkyl, alkenyl, aralkyl or an alkyl radical substituted with a halogen and in which R, $R_1$ and $R_2$ may be the same or different radicals.

These complexes are useful as reducing agents for reducing various organic and inorganic compounds, such as for reducing aldehydes to carbinols, nitriles to amines and carboxylic acid esters to primary carbinols. Some of these complexes are crystalline or glassy solids and others are liquids with a tendency to supercooling. They are stable compounds and are soluble in a variety of solvents, such as diethyl ether, benzene, hexane, chloroform, carbon tetrachloride and tetrahydrofuran, the solubility varying with the specific complex and specific solvent. The thermal stability of these compounds varies, some being distillable while others decompose before reaching the distillation temperature.

One method for preparing these compounds is described in my copending application Serial No. 683,953, filed September 16, 1957. In accordance with this method aluminum hydride is reacted with an ester of boric acid in a liquid carrier at a temperature between the temperature at which aluminum hydride decomposes, the preferred temperature being between 0° C. and normal room temperature. The reaction is illustrated by the reaction of aluminum hydride with methyl borate as shown by the equation:

$$4AlH_3 + 3B(OCH_3)_3 \rightarrow AlH_3(BH_3)_3[Al(OCH_3)_3]_3$$

One or more moles of methyl borate in the above equation may be replaced by the boric acid ester of a different alcohol.

The present invention provides another method for preparing the above mentioned complexes. In accordance with the method of the present invention an aluminum alcoholate is reacted with diborane in a liquid carrier containing a solvent for diborane at a temperature between about 0° C. and about normal room temperature. The aluminum alcoholate may be selected from those having the formulas $Al(OR)_3$, $Al(OR_1)_3$, $Al(OR_2)_3$, $$Al\begin{matrix}OR\\-OR\\OR_1\end{matrix},\quad Al\begin{matrix}OR\\-OR_1\\OR_2\end{matrix}$$

and mixtures thereof where R, $R_1$ and $R_2$ are monovalent radicals selected from the group consisting of alkyl, cycloalkyl, alkylene, aralkyl or an alkyl radical substituted with a halogen and in which R, $R_1$ and $R_2$ may be the same or different radicals. The reaction is illustrated by the reaction of diborane with aluminum methylate as shown by the equation:

$$2B_2H_6 + 4Al(OCH_3)_3 \rightarrow AlH_3(BH_3)_3[Al(OCH_3)_3]_3 + B(OCH_3)_3$$

In the preferred practice of the invention, the aluminum methylate in the above equation may be replaced by another aluminum alkylate, a mixture of aluminum alkylates, a mixed molecule aluminum alkylate or mixtures thereof. Suitable liquid carriers are the ethers, such as diethyl ether, tetrahydrofuran, dibutyl ether or the dimethyl or diethyl ethers of diethylene glycols, and hydrocarbon solvents, such as hexane, cyclohexane or benzene, or mixtures of an ether and a hydrocarbon solvent. If the liquid carrier is not a solvent for diborane, a solvent is mixed with the liquid carrier in an amount sufficient to dissolve the diborane.

As illustrative of aluminum alcoholates which may be used in the practice of the invention, I may mention aluminum ethylate, isopropylate, hexylate, methylate, n-propylate, dimethyl monoisopropylate, n-butylate, tertiary butylate, secondary butylate, n-amylate, tertiary amylate, methyl isobutyl carbinylate, 3-heptylate, di-isopropyl carbinylate, n-octylate, 2,6,8-trimethyl-4-nonylate, allylate, oleylate, stearylate, 2-methyl-2,4-pentanediol alcoholate, benzylate, p-methyl benzylate, o-methyl benzylate, 2-phenyl cyclohexylate, 1-3-dichloro-2-propylate, cyclohexylate, cyclopentylate and cycloheptylate.

The invention is illustrated further by the following specific examples.

Example 1

A solution of diborane in tetrahydrofuran was prepared as follows. 136 ml. of a lithium aluminum hydride solution in diethyl ether containing 7.5 percent lithium aluminum hydride was diluted with 50 ml. of diethyl ether and added to a solution of 47.6 grams of boron trifluoride etherate in 150 ml. of diethyl ether. The diborane generated was absorbed in 80 ml. of tetrahydrofuran. 0.5 ml. of this solution evolved 70 ml. of hydrogen on hydrolysis indicating that the whole solution contained 2.32 grams of diborane.

34.7 grams of aluminum isopropylate was dissolved in 150 ml. of tetrahydrofuran and this solution was added to the above diborane solution. A clear solution resulted. There was no apparent reaction or heat evolved. The reaction mixture was allowed to stand for about 10 days. The tetrahydrofuran was then distilled out at atmospheric pressure under a nitrogen atmosphere; then distillation under about 1 mm. vacuum gave a forerun of 10 grams which was a mixture of isopropyl borate and tetrahydrofuran. This was fractionated separately at atmospheric pressure. Then, the product was distilled under a vacuum of about 1 mm. and at a temperature between 120° C. and 125° C. a distillate of 23.3 grams was obtained. The product analyzed 1.76 percent active hydrogen. The theoretical active hydrogen content of the desired product is 1.80 percent.

Example 2

Aluminum dimethyl monoisopropylate was prepared in the following manner. 20.4 grams of freshly distilled aluminum isopropylate was dissolved in 120 ml. of dry benzene. 15 ml. of methanol was added to the solution and a gel formed. The mixture was refluxed for 30 minutes. The methanol was pulled off by vacuum evaporation leaving a very fine powder.

10.4 grams of this powder was mixed with 150 ml. of tetrahydrofuran. The suspension was added to a solution of 0.98 gram of diborane in 39 ml. of tetrahydrofuran. The mixture was stirred for 3 hours at 20°–25° C. Several days later, the solution was evaporated in vacuum and dried at 80° C. at about 1 mm. pressure to constant weight. The resulting white powder weighed 10.9 grams, the yield being about 96 percent of the theoretical. The powder contained 1.9 percent active hydrogen.

I claim:

1. The method for preparing complexes of aluminum alcoholates with aluminum and boron hydrides having the formula

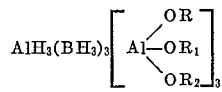

where R, $R_1$ and $R_2$ are monovalent radicals selected from the group consisting of alkyl, cycloalkyl, alkenyl, aralkyl and an alkyl radical substituted with a halogen which comprises reacting an aluminum alcoholate with diborane in an inert liquid carrier in which diborane is soluble in the proportion of two moles of diborane to four moles of aluminum alcoholate, the aluminum alcoholate being selected from the group consisting of those having the formulas $Al(OR)_3$, $Al(OR_1)_3$, $Al(OR_2)_3$,

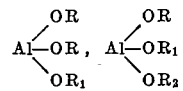

and mixtures thereof.

2. The method as claimed by claim 1 wherein the aluminium alcoholate is a mixed molecule aluminum alkylate.

3. The method as claimed by claim 1 wherein the aluminum alcoholate is a mixture of aluminum alkylate.

4. The method as claimed by claim 1 wherein the aluminum alcoholate is aluminum isopropylate.

5. The method as claimed by claim 1 wherein the aluminum alcoholate is aluminum dimethyl monoisopropylate.

References Cited in the file of this patent
UNITED STATES PATENTS 2,461,661    Schlesinger _____ Feb. 15, 1949
2,461,662    Schlesinger _____ Feb. 15, 1949